US009223663B2

(12) United States Patent
Hom et al.

(10) Patent No.: US 9,223,663 B2
(45) Date of Patent: Dec. 29, 2015

(54) RESOLVING MEMORY FAULTS WITH REDUCED PROCESSING IMPACT

(75) Inventors: David Hom, Poughkeepsie, NY (US); Matthew J. Mauriello, Fishkill, NY (US); Donald W. Schmidt, Stone Ridge, NY (US); Paula M. Spens, Poughkeepsie, NY (US); Elpida Tzortzatos, Lagrangeville, NY (US); Chun-Kwan K. Yee, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 13/530,260

(22) Filed: Jun. 22, 2012

(65) Prior Publication Data

US 2013/0346792 A1    Dec. 26, 2013

(51) Int. Cl.
*G06F 11/00*    (2006.01)
*G06F 11/20*    (2006.01)
*G06F 11/07*    (2006.01)
*G06F 12/02*    (2006.01)
*G06F 12/10*    (2006.01)
*G06F 12/06*    (2006.01)

(52) U.S. Cl.
CPC .............. *G06F 11/20* (2013.01); *G06F 11/073* (2013.01); *G06F 11/0793* (2013.01); *G06F 12/0292* (2013.01); *G06F 12/1009* (2013.01); *G06F 12/06* (2013.01)

(58) Field of Classification Search
CPC ... G06F 12/10; G06F 12/109; G06F 12/1036; G06F 12/1075; G06F 2212/684
USPC ................... 714/5.11; 711/203, 147, 152, 141
See application file for complete search history.

(56) References Cited

U.S. PATENT DOCUMENTS

| 4,714,993 | A | * | 12/1987 | Livingston et al. | ........... 711/206 |
| 5,361,356 | A | * | 11/1994 | Clark et al. | ................... 711/206 |
| 5,842,225 | A | * | 11/1998 | Kohn | ............................. 711/202 |
| 5,893,152 | A | * | 4/1999 | Fuller et al. | .................... 711/141 |
| 6,073,226 | A | * | 6/2000 | Cutshall et al. | ............... 711/203 |
| 6,199,152 | B1 | * | 3/2001 | Kelly et al. | .................... 711/207 |
| 6,865,651 | B2 | | 3/2005 | Woodward | |

(Continued)

OTHER PUBLICATIONS

Mosberger, "IA-64 Linux Kernel: Design and Implementation", 2002, Prantice Hall, p. 131-208.*

(Continued)

*Primary Examiner* — Bryce Bonzo
*Assistant Examiner* — Jeison C Arcos
(74) *Attorney, Agent, or Firm* — David J. Zwick; Noah A. Sharkan (57) ABSTRACT

A fault occurs in a virtual environment that includes a base space, a first subspace, and a second subspace, each with a virtual address associated with content in auxiliary storage memory. The fault is resolved by copying the content from auxiliary storage to central storage memory and updating one or more base space dynamic address translation (DAT) tables, and not updating DAT tables of the first and second subspace. A subsequent fault at the first subspace virtual address is resolved by copying the base space DAT table information to the first subspace DAT tables and not updating the second subspace DAT tables. A fault occurring with association to the virtual address of the first subspace is resolved for the base space and the base space DAT table information is copied to the first subspace DAT tables, and the second subspace DAT tables are not updated.

19 Claims, 4 Drawing Sheets

(56) References Cited

U.S. PATENT DOCUMENTS

| | | | |
|---|---|---|---|
| 6,976,255 | B1 | 12/2005 | Clark et al. |
| 6,981,125 | B2 | 12/2005 | Emmes |
| 2004/0078631 | A1* | 4/2004 | Rogers et al. ............... 714/5 |
| 2005/0132249 | A1* | 6/2005 | Burton et al. ............... 714/5 |
| 2009/0193214 | A1* | 7/2009 | Greiner et al. ............. 711/166 |
| 2009/0216516 | A1* | 8/2009 | St. Onge et al. ............. 703/21 |
| 2009/0217098 | A1* | 8/2009 | Farrell et al. ............... 714/37 |
| 2011/0145511 | A1 | 6/2011 | Woffinden |

OTHER PUBLICATIONS

Tinker, "Managing Large Address Spaces Effectively on the Butterfly" Apr. 1987, University of Utah, p. 1-10.*

Li, "Memory Coherence in Shared Virtual Memory Systems", Nov. 1989, ACM, vol. 7 No. 4, p. 321-359.*

Lin, "Virtual Memory", 2003, umd.edu, p. 1-9.*

Huck, "Architectural Support for Translation Table Management in Large Address Space Machines" 1993, IEEE, p. 39-50.*

Red Hat, "Red Hat Enterprise Linux 3 Introduction to System Administration" 2003, Red Hat, p. 49-53.*

Mosberger "IA-64 Linux Kernel: Design and Implementation" 2002, Pearson Education, p. 131-208.*

Ebbers et al. "Introduction to the New Mainframe z/OS Basics". Third Edition (Mar. 2011). IBM. ibm.com/redbooks. pp. 101-126. © Copyright International Business Machines Corporation 2006, 2009, 2011.

IBM. "z/Architecture Principles of Operation SA22-7832-08". Ninth Edition (Aug. 2010). pp. 3-4-3-5; 3-34-3-46. © Copyright International Business Machines Corporation 1990-2010.

IBM TDB. "A Real-Space Designation for Using Real Addresses along with Virtual Addresses". IP.com PriorArtDatabase Technical Disclosure. IP.com No. IPCOM000013749D. Original publication date: Dec. 11, 2002, IP.com Electronic Publication: Jun. 18, 2003.

Krzyzanowski. "Operating Systems Memory Management: Paging System". Oct. 20, 2010 [updated Mar. 23, 2011]. [online] Retrieved on: Jun. 20, 2012. Retrieved from the internet: <URL:http://www.cs.rutgers.edu/~pxk/416/notes/09a-paging.html>.

Rusling. "The Linux Kernel:Chapter 3: Memory Management" © 1996-1999 David A Rusling. Berkshire RG41 3NF, United Kingdom.

* cited by examiner

RESOLVING MEMORY FAULTS WITH REDUCED PROCESSING IMPACT

FIELD OF THE INVENTION

The present invention relates generally to memory management methods, and more particularly to a method of memory fault management that reduces the performance impact of resolving memory access exceptions and page faults.

BACKGROUND

Contemporary computing devices are often required to operate multiple programs and processes concurrently. Concurrent operation requires code protection and can be limited by the available physical memory of a computing device. The introduction of techniques that use virtual memory has removed this limitation. The term "virtual memory," also called virtual storage or logical memory, refers to the abstraction of separating virtual storage, which is seen by the processes of a program, from the physical memory, which is the real memory as seen by a central processing unit (CPU) of a computing device. The separation is managed typically by the operating system and the memory management unit of one or more processors. The separation also offers the convenience to an application programmer that they only need to be aware of the virtual storage space.

A process is an instance or invocation of a program and two or more processes can run the same program at the same time. For example, a calculator program can be opened twice, resulting in two instances of the same calculator program. One of the concerns of multiple processes operating concurrently is the protection of the process code and data, so that the activity of one process doesn't overwrite the code or data of another process. Various techniques of virtual storage offer protection and isolation of program processes running concurrently.

The addressing limits of virtual storage are governed by the system architecture of a computing device and the virtual storage memory can be many times larger than the actual physical memory of the system. Each process can operate as if it has access to the full range of virtual storage. This can produce the illusion to an executing program that the system has significantly more storage than it physically has. Virtual storage addresses are translated to physical or real storage location addresses through the use of tables that map blocks of contiguous virtual storage space to real memory space in central storage or to auxiliary storage typically in a direct access storage device (DASD) of a computing system. The tables used to map virtual storage are also referred to as dynamic address translation (DAT) tables, as they are used to translate a virtual address to a physical address during a CPU access of the virtual address. Portions of an executing program that are currently being accessed by a CPU need to be loaded into real memory or central storage memory, such as random access memory (RAM).

When one or more system CPUs require program process instructions or data to continue execution of a program task, and the instructions or data are not found in central storage memory or the information to translate the virtual address to a physical address is not complete in the DAT tables, a situation referred to as a memory access exception or fault occurs. Such occurrences typically require intervention by the operating system of the computing device to resolve the fault before processing of the program task can continue. Resolving the fault can involve locating the required program instructions or data in auxiliary memory and loading a copy into central storage memory, and includes updating DAT tables that are used to map the virtual address of the program instructions or data to the real memory address location where the program instructions or data have been loaded. The fault resolution and updating of translation tables consumes system time and results in a loss of computing device performance. Expediting fault resolution and translation table updates will minimize the impact to system performance.

SUMMARY

Embodiments of the present invention provide a system, method, and program product for memory fault management in a virtual storage environment including a base space, a first subspace, and content stored in an auxiliary storage memory physical address, each of the base space and the first subspace having respective virtual addresses associated with the content stored in the auxiliary storage memory physical address. The computer determines that a fault associated with the base space virtual address has occurred and the computer, in response to determining that the fault associated with the base space virtual address has occurred, copies the content from the auxiliary storage memory physical address to a central storage memory physical address and updates a hierarchy of dynamic address translation (DAT) tables of the base space to associate the base space virtual address with the central storage memory physical address, and the computer does not update a hierarchy of DAT tables of the first subspace, and does not associate the first subspace virtual address with the central storage memory physical address.

In certain embodiments in which the virtual storage environment includes a second subspace, the second subspace having a virtual address associated with the content stored in the auxiliary storage memory physical address, the computer determines that a fault occurred. In response to the computer determining that a fault associated with the first subspace virtual address has occurred, the computer responds by updating the hierarchy of DAT tables of the first subspace to associate the first subspace virtual address with the central storage memory physical address, by copying information in the DAT tables of the base space that associates the base space virtual address with the central storage memory physical address, and not updating the hierarchy of DAT tables of the second subspace to associate the second subspace virtual address with the central storage memory physical address.

In other embodiments of the present invention, a system, method and program product is provided to manage memory faults of a computing device in a virtual storage environment which includes a base space, a first subspace, a second subspace, and content stored in auxiliary storage memory, such that each of the base space, the first subspace, and the second subspace having respective virtual addresses associated with the content. The computer determines that a fault associated with the first subspace virtual address has occurred.

In response to determining that the fault that occurred is associated with the first subspace virtual address, the computer copies the content from the auxiliary storage memory physical address to a central storage memory physical address. In addition, in response to determining that the hierarchy of dynamic address translation (DAT) tables of the base space does not associate the base space virtual address with the central storage memory physical address, the computer updates the hierarchy of DAT tables of the base space to associate the base space virtual address with the central storage memory physical address, and the computer updates the hierarchy of DAT tables of the first subspace to associate the first subspace virtual address with the central storage memory physical address, by copying information in the DAT tables of the base space that associates the base space virtual address with the central storage memory physical address, and not updating the hierarchy of DAT tables of the second subspace to associate the second subspace virtual address with the central storage memory physical address.

DETAILED DESCRIPTION

The content of a program selected for execution is assigned virtual addresses while only content that is immediately required for execution is loaded into central storage memory, accessible by CPUs. Other program content not immediately required may remain in auxiliary storage. A fault condition can result from program content that is accessed by a CPU but does not reside in central storage memory, as well as from incomplete or invalid information within DAT tables. Fault resolution includes loading the requested program content into CPU accessible memory, when required, and updating DAT tables that the computing device uses to map virtual addresses to physical locations. Selectively updating those DAT tables associated with a fault minimizes the system time required to resolve the fault and reduces impact to performance.

Figure 1A:
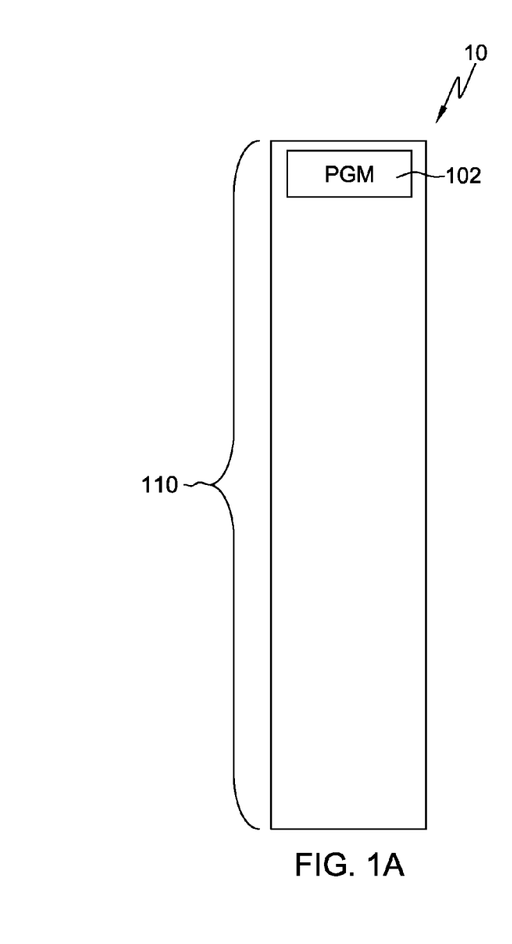
FIG. 1A is a block diagram representation of an address space within a virtual storage environment of a computer, in accordance with an embodiment of the present invention.
Figure 1B:
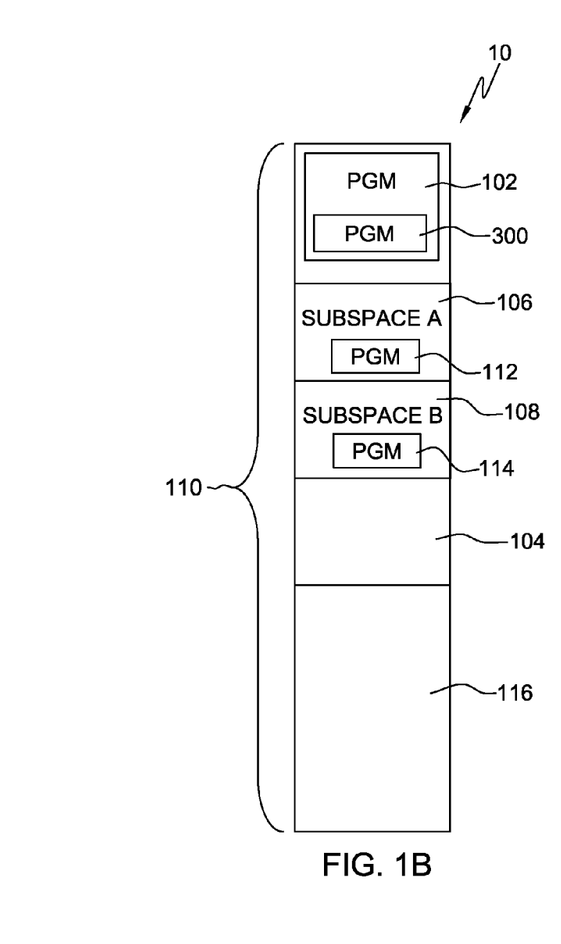
FIG. 1B is a block diagram illustrating the address space of FIG. 1A, including a base space that further includes two subspaces and the remaining subspace eligible virtual storage range within a virtual storage environment in accordance with an embodiment of the present invention.

Embodiments of the present invention will now be described in detail with reference to the accompanying drawings. FIGS. 1A and 1B display aspects of virtual storage environment 10 in accordance with a preferred embodiment of the invention. FIG. 1A displays virtual storage environment 10 including address space 110 and PGM 102, which is a program process operating within address space 110. An address space is a range of contiguous virtual addresses that the system creates for a program process, batch job, or system task. The range of virtual addresses in an address space starts at zero and can extend to the highest address permitted by the operating system architecture. An address space contains user data and programs, as well as system data and programs, some of which may be common to multiple address spaces. One benefit of virtual memory is allowing a program process to address the full memory range of its assigned address space, not withstanding ranges of memory designated as protected. A program's ability to access all of the storage associated with an address space is called full address addressability. In a preferred embodiment, PGM 102 is a system level program process, such as a program process of the operating system, and has full address space addressability.

Operating multiple program processes in address space 110 may introduce a risk of one program process overwriting the program code or data of another program process. To protect program process code and data, the operating systems can assign a program process to a subspace, which is a specific range of virtual storage in an address space, designed to isolate and limit the virtual storage that a program can reference.

FIG. 1B illustrates an embodiment of virtual storage environment 10 in which address space 110 includes subspace A 106 and subspace B 108. Program process PGM 112 and program process PGM 114 are active instances of programs operating within subspace A 106 and subspace B 108, respectively. Each program process is isolated within the respective subspace and is protected from invalid reference or being overwritten by concurrent operation of the other program process. An address space that includes one or more subspaces, or an address space discussed in the context of subspaces, is referred to as a "base space". Address space 110, which is shown with subspace A 106 and subspace B 108, will be subsequently referred to as base space 110. A base space and its subspaces form a group that is referred to as a "subspace group".

Base space 110 also includes subspace eligible range 104, which represents a range of virtual addresses that remains reserved for defining additional subspaces, and unassigned virtual storage 116, which is a range of virtual addresses available for allocation to any program operating in base space 110, subspace A 106 or subspace B 108. Base space 110 includes all the addressable virtual storage of the entire subspace group, and subspace A 106 and subspace B 108 each represent a portion of the virtual storage space within base space 110.

Figure 3:
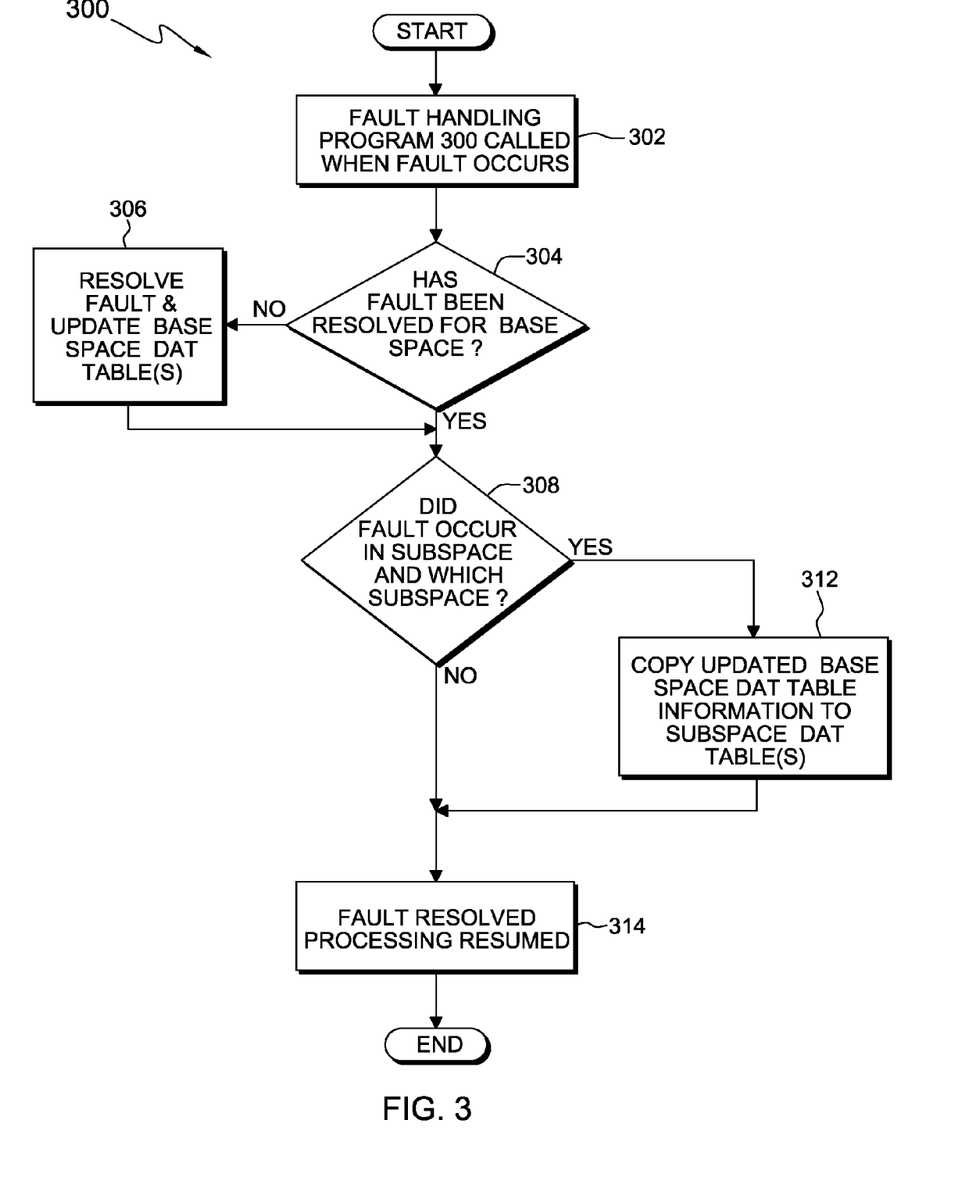
FIG. 3 is a flowchart illustrating the steps of a fault handling program module in accordance with an embodiment of the present invention.

In a preferred embodiment, PGM 102 is a process of the operating system and includes fault handling program 300, the operation of which is explained in greater detail with respect to FIG. 3. In other embodiments, fault handling program 300 may be integrated as part of operating system 828 of the computing device, or may function in some other relationship or combination with operating system 828 (see FIG. 4).

Figure 4:
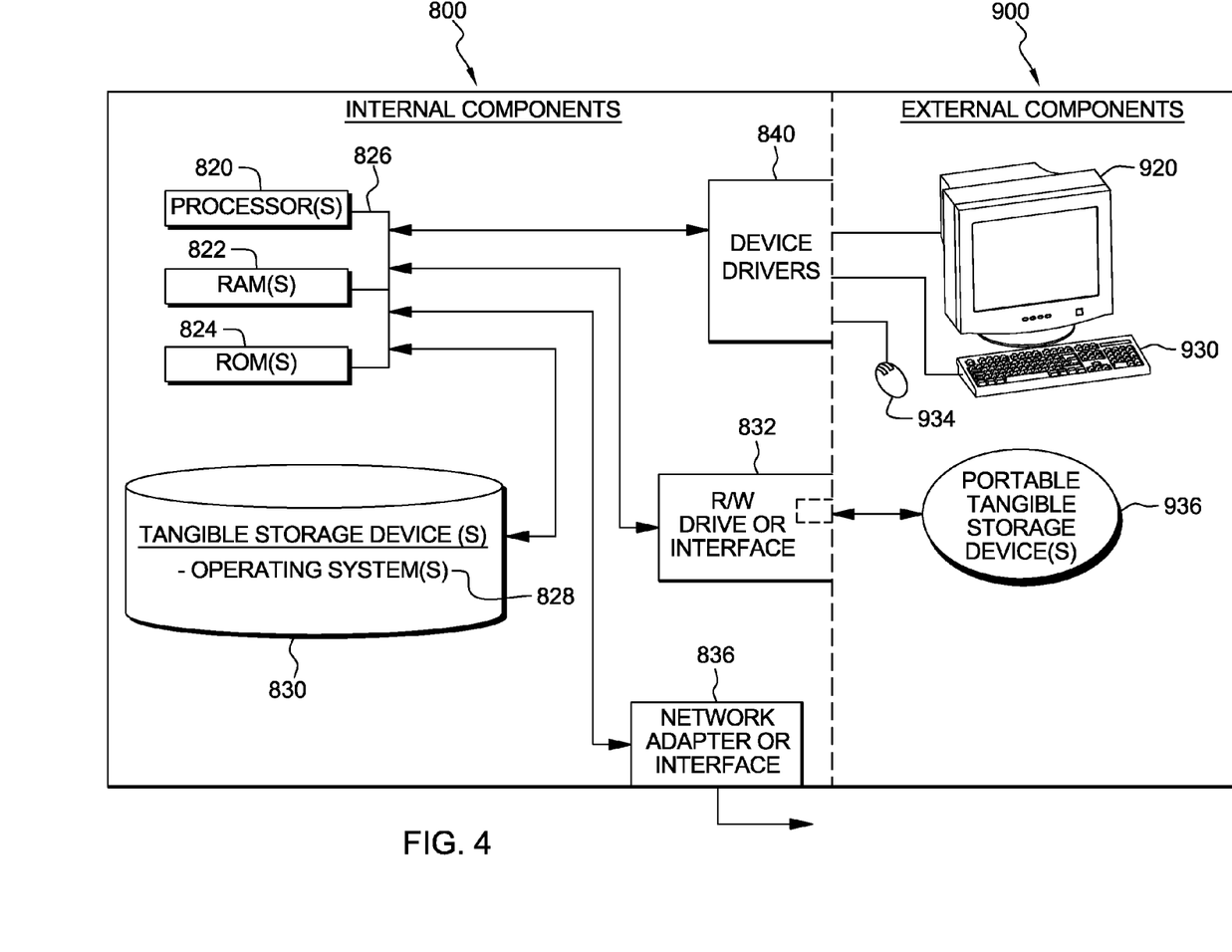
FIG. 4 is a block diagram of hardware and software within a computing device in accordance with an embodiment of the present invention.

In embodiments of the invention, there are two types of physical memory in computing devices: central storage memory, such as a RAM 822; and auxiliary storage memory not directly accessible by processor 820, such as a tangible storage device 830 (FIG. 4). Instructions and data must be in central storage memory 822/824 that is directly accessible by one or more CPUs, such as a processor 820, to be executed, while other program elements that are not immediately needed may remain in auxiliary storage 830. A virtual address is an identifier of a piece of program content, but not the location of where that piece of program content resides in physical memory. Computing devices with architectures that enable virtual storage make use of reference tables which function to translate virtual addresses into physical locations. In a preferred embodiment, this translation is accomplished by the use of a hierarchical structure of DAT tables.

Figure 2:
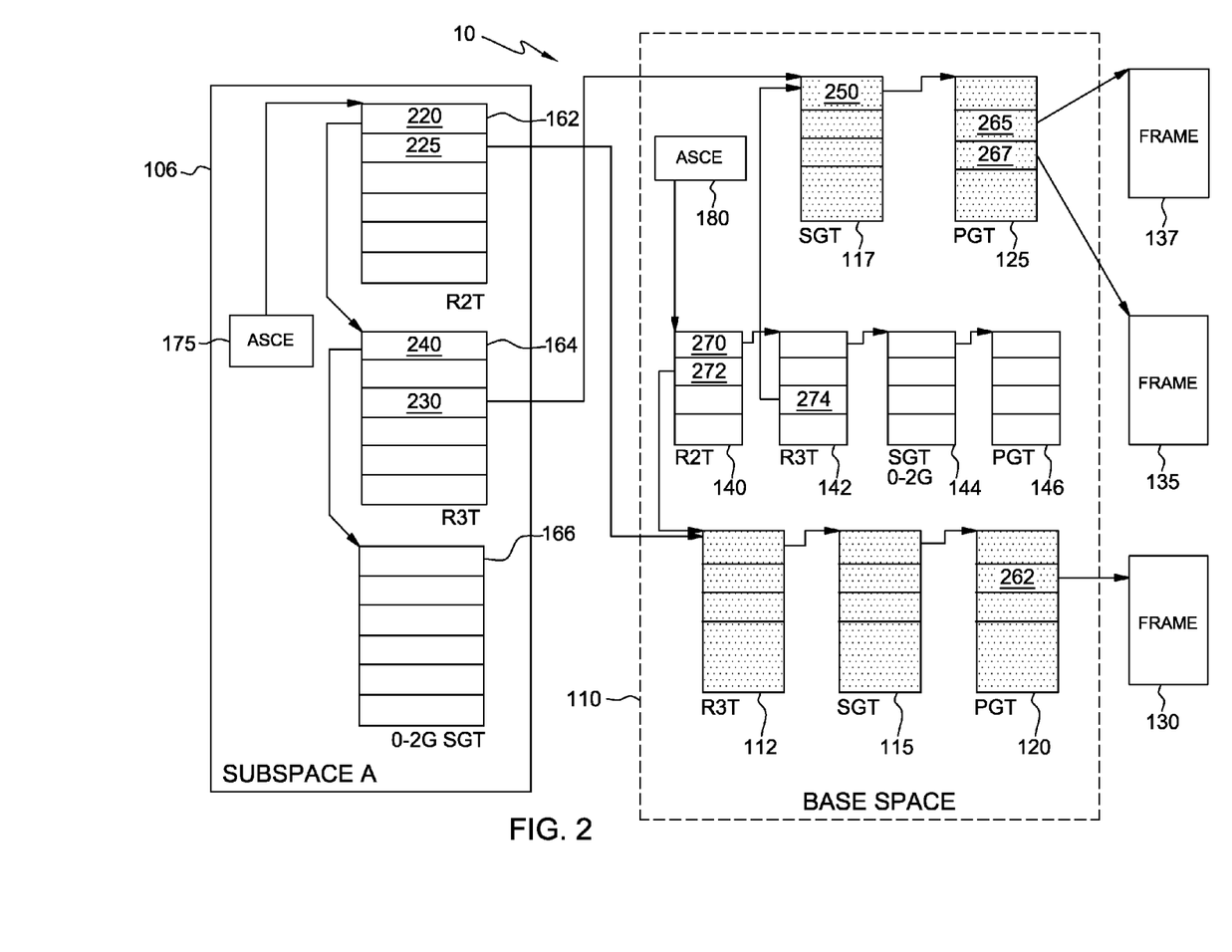
FIG. 2 is a block diagram of a subgroup including dynamic address translation tables of the base space and a subspace of FIG. 1B in accordance with an embodiment of the present invention.

FIG. 2 is a block diagram illustrating an exemplary embodiment of virtual storage environment 10 that includes base space 110 and subspace A 106, which together with subspace B 108 (not shown in FIG. 2), form a subspace group. Subspace A 106 is shown as having three DAT tables: DAT region $2^{nd}$ table ("R2T") 162 with entry 220 and entry 225; DAT region $3^{rd}$ table ("R3T") 164 with entry 230 and entry

240; and DAT segment table ("SGT") 166. Base space 110 is shown to have DAT tables that include: R2T table 140 with entry 270 and entry 272, R3T table 142 with entry 274, SGT table 144, and DAT page table ("PGT") 146. Base space 110 also includes DAT tables: R3T table 112, SGT table 115, SGT table 117 with entry 250, PGT table 120 with entry 262, and PGT table 125 with entry 265 and entry 267.

Generally, an entry in an R2T table points to or identifies the memory location of a specific R3T table, an entry in an R3T table identifies or points to a specific SGT table, and an entry in a SGT table points to a specific PGT table. The information in PGT table entries identifies a block of virtual addresses known as a page, and the entry translates the page into the location of a block of physical memory, referred to as a frame. For example, the physical location of frame 135 is identified from information in PGT table 125, entry 267, whereas the physical location of frame 137 is identified from information in PGT table 125, entry 265.

Using hierarchical sets of DAT tables, each member of the subspace group can reference all of the virtual addresses required by their respective operating program processes. For example, the DAT table hierarchy structure for subspace A 106, which includes R2T table 162, R3T table 164, and SGT table 166, and the associated DAT page tables for subspace A 106 (not shown), can reference the protected virtual addresses required for programs running in subspace A 106. Similarly, there is a hierarchical structure of DAT tables for base space 110, for example, R2T table 140 in combination with all subordinate DAT tables of base space 110, which includes, for example, R3T table 142, SGT table 144, and PGT table 146, R3T table 112, SGT table 115, PGT table 120, SGT table 117 and PGT table 125, in combination with other R3T, SGT and PGT tables not shown in FIG. 2, can translate the entire virtual storage range of the subspace group. In one embodiment of the present invention, DAT tables R3T 112, SGT 115, SGT 117, PGT 120 and PGT 125 are "shared" DAT tables and as such they are accessible by any member of the subspace group. Shared DAT tables can have higher level DAT tables from more than one subspace group member with an entry that points to the "shared" DAT table.

As an example of the hierarchical structure of DAT tables, in the exemplary embodiment illustrated in FIG. 2, R2T table 162 in subspace A 106 contains entry 220 which points to R3T table 164, and entry 225, which points to shared R3T table 112. Similarly, R3T table 164 contains entry 230 that points to shared SGT table 117, and entry 240 that points to SGT table 166. Each entry of a PGT table, such as entry 262 of PGT table 120, translates a page, such as a page represented by entry 262, to a frame, such as frame 130, which is located in either central storage or auxiliary storage memory.

In the exemplary embodiment illustrated in FIG. 2, subspace A 106 does not require access to the entire range of virtual storage available with full 64-bit addressing. As such, R2T table 162 serves as the top level DAT table. R2T table 162 is one of three types of region-level DAT tables. In other embodiments, a subspace may require larger amounts of virtual storage, in which case a DAT region 1$^{st}$ table (R1T) (not shown) may be included. Each entry of an R1T table identifies or points to a location in memory of an R2T table, and each entry of a R2T table identifies or points to the location in memory of a R3T table. In this manner virtual addresses are defined to the extent required by the program processes running in the subspace or base space and the DAT table hierarchy is structured to translate the extent of virtual storage required.

When performing a virtual address translation, the operating system of the computing device determines the starting point of the translation by accessing an address space control entry (ASCE) that identifies the location in memory of the top level DAT table for the base space or a subspace. For example, ASCE 175 in subspace A 106 identifies R2T table 162 as the starting point for all virtual to physical address translations in subspace A 106, and ASCE 180 is the starting point for all virtual to physical address translations for base space 110.

In the exemplary embodiment, DAT tables 140, 142, 144, and 146 are used exclusively by base space 110, and are not shared with subspace A 106 or subspace B 108 of the subspace group. However in a preferred embodiment, FIG. 2 illustrates base space 110 as including R3T table 112, SGT table 115, SGT table 117, PGT table 120 and PGT table 125, which represent DAT tables that are "shared", meaning that the tables are common to more than one member of the subspace group within an address space. Although illustrated as part of base space 110 DAT tables for convenience, shared DAT tables are not specifically associated with any one member of the subspace group, but rather all members of the subspace group. The "shared" aspect of the DAT tables is indicated by shading in FIG. 2. By sharing DAT tables that translate virtual storage accessible to all subspace members, to real or physical storage, additional central storage memory is freed up, which will contribute to improving system performance. DAT tables that are shared or point to shared DAT tables, such as R2T table 140, R3T table 142, R3T table 112, SGT table 115, SGT table 117, PGT table 120, and PGT table 125, in conjunction with R2T table 162, R3T table 164 of subspace A 106, translate a portion of the virtual address range illustrated by unassigned virtual storage 116 (FIG. 1B).

In the exemplary embodiment, a typical page fault occurs when a program process accesses a virtual storage address associated with program content, which can be program instructions or data, and the frame that includes the program content is not located in central storage memory. The fault is resolved by loading a copy of the content associated with the virtual address from auxiliary storage memory into central storage memory, and updating the appropriate DAT table hierarchy with the information that associates the virtual address with the central storage memory physical address. Additionally, a fault can occur when a DAT table entry is invalid or unavailable. In such cases DAT tables are built to resolve the fault and may require DAT tables to be added to the DAT hierarchy structure. Fault resolution, as in virtual address translation, progresses from higher level DAT tables in the hierarchy structure, to subordinate level DAT tables. If a fault is encountered at an entry in a Region level DAT table, for example R3T table 112, the fault is resolved for R3T table 112 and translation progresses to the next subordinate level, which would be SGT table 115 DAT table. If a fault is encountered at the entry in table SGT table 115, then the fault is resolved for this DAT table and translation continues to the next subordinate level, such as PGT table 120, for example. In this way, multiple faults are possible and are resolved in the order in which they are encountered.

When a fault occurs at a virtual address within a subspace group, the fault is first resolved for the base space followed by steps to determine if additional DAT table hierarchy structures require update, as described in detail below. Typically, processor(s) 820 of computing device 800 (FIG. 4) continues to process instructions until a fault occurs, whereupon an interrupt of CPU processing is initiated. In a preferred embodiment, operating system 828 then passes control to fault handling program 300 to resolve the fault.

Although subspace A 106 maintains a DAT table structure that references all the virtual address space defined for subspace A, for example R2T table 162, R3T table 164, and SGT table 166, base space 110 maintains a DAT table structure that encompasses the entire range of virtual addresses of base space 110, which includes the virtual address ranges assigned to subspace A 106, subspace B 108, and unassigned virtual storage 116. The DAT tables displayed in FIG. 2 for subspace A 106 and base space 110 are intended to provide an example that represents the hierarchical structure of DAT tables and the concept of shared and unshared DAT tables, such that program processes running in a subspace or base space of a subspace group may have shared DAT tables in common, for purposes of discussion of embodiments of the present invention. Depending on the allocated virtual storage range of the base space, the DAT table hierarchical structure typically includes many more DAT tables than depicted in FIG. 2. For example, in an exemplary embodiment of 64-bit addressable virtual storage, an R1T table can identify the location of up to 2048 R2T tables and each R2T table can identify up to 2048 R3T tables. Each R3T table can identify up to 2048 SGT tables and each SGT table can identify up to 2048 PGT tables; potentially resulting very large numbers of tables.

FIG. 3 is a flow chart illustrating the steps of fault handling program 300 which will be further illustrated by example. When operating system 828 detects a memory fault, it passes control to fault handling program 300 (step 302). For example, in the exemplary embodiment illustrated in FIGS. 1B and 2, PGM 112 executing in subspace A 106 accesses a virtual address associated with program content, for instance a virtual address associated with entry 225 of R2T table 162 identifies or points to DAT R3T table 112 in base space 110. R3T table 112 has an entry that points to SGT table 115 that has an entry that points to PGT table 120. Entry 262 in PGT table 120 points to the location of frame 130. However, when entry 262 is accessed, the location of frame 130 is not found in central storage memory, such as RAM 822 (FIG. 4), and a memory fault occurs. In a preferred embodiment, operating system 828 then passes control to fault handling program 300.

Fault handling program 300 then determines if the fault has been resolved for base space 110 (decision step 304). If fault handling program 300 determines that the fault has not been resolved for base space 110 (decision step 304, no-branch), then fault handling program 300 resolves the fault and updates the base space 110 DAT tables (step 306). For example, entry 262 of PGT table 120, which points to frame 130, indicates that frame 130 is physically located in auxiliary storage, such as tangible storage device 830. Fault handing program 300 then determines that the fault is not resolved for base space 110.

Fault handling program 300 then resolves the fault for base space 110 by locating the content of frame 130 in auxiliary storage, such as tangible storage device 830, and loading a copy of the content into central storage memory, such as RAM 822. Fault handling program 300 then updates entry 262 of PGT table 120 to indicate that frame 130 now resides in central storage memory. Thus, the fault originally caused by PGM 112 in subspace A 106 accessing a physical location in frame 130 via entry 262 of shared PGT table 120, has been resolved for base space 110 with the loading of frame 130 into central storage memory and the updating of entry 262 in PGT table 120.

Because several program processes can be operating concurrently within the subspace group, faults can be associated with either the base space or one of the subspaces. Having resolved the fault for base space 110, fault handling program 300 then determines if the fault occurred at a virtual address associated with a subspace, and if so, with which subspace the fault is associated (decision step 308). Continuing with the example, because the fault occurred while PGM 112, operating in subspace A 106, was accessing the virtual address that translates to entry 262 of PGT table 120, fault handling program 300 determines that the fault is associated with subspace A 106 (step 308 yes-branch).

Fault handling program 300, having previously copied the content of frame 130 into central storage memory while resolving the fault for base space 110 (see step 306) to resolve the fault for subspace A 106, need only update the DAT table hierarchy structure of subspace A 106, (step 312). In one embodiment, because PGT table 120 is a shared DAT table, the updates performed to resolve the fault for base space 110 apply to the access of PGT table 120 by subspace A 106. Alternatively, if the fault was produced, for example, by invalid, or unavailable translation information in entry 225, then resolving the fault for base space 110 may involve building one or more DAT tables and updating the entries of the DAT table hierarchy structure of base space 110 (step 306) to reflect the valid location of the DAT tables. Fault handling program 300 determines that the fault is associated with subspace A 106 (step 308), since the information in entry 225 of R2T table 162 was determined to be invalid. This is followed by updating the DAT table hierarchy structure of subspace A 106, which in this alternative case, includes completing the translation information for entry 225 of R2T 162. Fault handling program 300 does this by copying the previously updated DAT table information from base space 110 into the DAT table hierarchy structure of subspace A 106 (step 312). Fault handling program 300 copies the appropriate translation information into entry 225 of R2T table 162. When the DAT table updates for subspace A 106 are complete, the fault is resolved for both base space 110 and subspace A 106, and in step 314, control is returned to the CPU(s) to resume processing and fault handling program 300 ends.

In another exemplary embodiment, a program operating within the base space accesses a virtual address which results in a fault. In this case, the fault is not associated with a subspace. For example, PGM 102 operating in base space 110, accesses a virtual address that translates from ASCE 180 to R2T table 140, and entry 270 of R2T table 140 points to R3T table 142. Entry 274 of R3T table 142 points to SGT table 117, which has entry 250 that points to PGT table 125 (FIG. 2). In this example, the content identified by entry 265 of PGT table 125, corresponds to frame 137, which is not found in central storage memory and a fault occurs.

Fault handling program 300 is called (step 302) and determines that the fault has not been resolved for base space 110 (step 304 no-branch) because entry 265 of PGT table 125 indicates the physical location of frame 137 to be in auxiliary storage memory, such as tangible storage device 830. Fault handling program 300 then resolves the fault for base space 110, as described above for step 306. Fault handling program 300 further determines (decision step 308) that the fault did not occur in a subspace because the fault occurred while PGM 102, operating in base space 110, was accessing entry 265 of PGT table 125 in base space 110. Therefore fault handling program 300, returns control to the CPUs (step 308, no-branch) to resume processing in step 314, at which point fault handling program 300 ends. In particular, although frame 137 has been loaded into central memory as part of the process of resolving the fault for base space 110 (step 306), there may be DAT table structures of subspaces that also translate virtual addresses to frame 137 but these are not updated to reflect that frame 137 now resides in central memory, because the subspaces were not associated with the fault.

If a program process operating in a subspace, such as PGM 112 operating in subspace A 106, does not subsequently access the virtual address that was previously resolved for PGT table 125 in base space 110, then no fault condition occurs for subspace A 106 and updating subspace A 106 DAT tables along with interrupting CPU processing, is not required. By only updating the DAT tables of base space 110, the impact of interrupting CPU processing is minimized.

In an additional exemplary embodiment, a first fault initially occurs while translating a virtual address in the base space. After the first fault is resolved, a second fault subsequently occurs in a subspace during translation of a virtual address accessing the same physical memory frame. For example, in an exemplary embodiment, PGM 102 operating in base space 110, accesses a virtual address that is translated from ASCE 180 to R2T table 140 and entry 270 pointing to R3T table 142 (FIG. 2). Entry 274 in R3T table 142 contains information that in this case is invalid or unavailable and the first fault occurs. Fault handling program 300 resolves the first fault for base space 110 by updating or building the appropriate DAT table to allow the translation of the virtual address to continue to the next subordinate level of DAT table, which in this example would be SGT table 117. Entry 250 in SGT table 117 is updated to point to PGT table 125 with entry 267 which is updated to indicate the location of frame 135 that is loaded into central storage memory. The updates to the tables and entries resolve the fault. Having resolved the fault and updated the DAT table structure, fault handling program 300 determines that the fault is not associated with a subspace (step 308) because the virtual address at which the fault occurs is accessed by PGM 102 running in base space 110. Fault handling program 300 then returns control to the CPUs in step 314.

Subsequent to the first fault being resolved for base space 110, PGM 112, operating in subspace A 106 attempts to access a virtual address using the DAT table hierarchy structure of subspace A 106 that translates to the same physical address. For example, the translation includes ASCE 175 locating the subspace A 106 top DAT table, R2T 162, with entry 220 that points to R3T 164. Entry 230 in R3T 164 is associated with the virtual address to be translated, however the information in entry 230 indicates that the entry is invalid or unavailable and a second fault occurs. The virtual address accessed by PGM 112 operating in subspace A 106 translates to entry 267 of PGT table 125 that points to frame 135 which was loaded into central storage memory when resolving the first fault. Similarly, the DAT table structure was updated as part of resolving the first fault for base space 110. In the process of resolving the first fault, the DAT table hierarchy structure for subspace A 106 is not updated because it was not associated with the first fault, and the information within entry 230 of R3T 164 still indicates that the virtual storage translation information associated with entry 230 is invalid or unavailable.

Operating system 828 calls fault handling program 300 (step 302) which determines that the second fault has been resolved for base space 110 (step 304) because frame 135 is now physically located in central storage memory, and base space 110 DAT table hierarchy structure is updated to reflect the complete translation information to locate frame 135 in central storage memory, removing the indication of invalid or incomplete information. Subspace A 106 is identified by fault handling program 300 to be associated with the second fault (step 308, yes-branch), because the second fault results from PGM 112 operating in subspace A 106, accessing a virtual address that points to entry 250 of SGT table 117, then to entry 267 of PGT table 125, which points to frame 135, located in central storage memory.

Resolving the second fault involves just updating the DAT table hierarchy structure of subspace A 106 because the content in frame 135, corresponding to the virtual address, has already been placed in central storage memory by previously resolving the first fault for base space 110. Fault handling program 300 only updates the DAT table hierarchy structure of subspace A 106, and does so by copying the updated information from base space 110 DAT tables into the DAT table hierarchy structure of subspace A 106 (step 312). For example, entry 230 of R3T table 164 is updated to reflect the complete translation information to locate frame 135 in central storage memory, removing indication of invalid or incomplete information. All other subspaces that may be operating within the subgroup and did not incur a fault, such as subspace B 108, are unaffected and the DAT tables for unaffected subspaces are not updated. In addition to the explicit impact of updating DAT table information there are additional requirements of updating DAT tables including synchronization of all processors and purging translation information stored in buffers. The cumulative performance impact can be significant. Updating only those DAT tables that are associated with the fault, reduces the overall impact to processing performance. In response to resolving the second fault, fault handling program 300 returns control to the CPUs, processing continues (step 314), and fault handling program 300 ends.

It should be noted that although embodiments in which table entries indicating the translation information to be invalid or incomplete were described as a fault that was resolved in one step, such circumstances may result in multiple faults, and may require building and updating of DAT tables, to completely establish the translation path of the virtual address accessed, depending upon the extent of unavailable or invalid information.

Although the exemplary embodiment disclosed describes operation of the embodiment with respect to page faults that involve a page of virtual addresses whose corresponding physical addresses are not located within a frame in central storage memory, and table entries indicating invalid or incomplete translation information, embodiments of the invention can apply to other types of memory faults. As stated above, it should also be noted that the reference to auxiliary storage in the embodiments described herein is intended to include any memory storage used by the computing device to store content that is not directly accessible to the CPUs of the computing device. The exemplary embodiments disclosed are illustrations of possible implementations and do not imply any limitations with regard to other possible embodiments that may be implemented.

FIG. 4 shows a block diagram of the components of a data processing system 800, 900, such as a client computing device, server computer or mainframe computer, on which fault handling program 300 operates in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, mainframe computer systems, thin clients, thick clients, hand-held or laptop devices, multiprocessor systems, microprocessor-based systems, network PCs, minicomputer systems, and distributed cloud computing environments that include any of the above systems or devices.

Data processing system 800, 900 includes respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 102, 112, 114 and 300 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 102, 112, 114 and 300 can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless wi-fi interface cards, or 3G or 4G wireless interface cards or other wired or wireless communication links. The programs 102, 112, 114 and 300 can be downloaded from an external computer via a network (for example, the Internet, a local area network or other, wide area network) and respective network adapters or interfaces 836. From the network adapters or interfaces 836, the programs 102, 112, 114 and 300 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for managing dynamic address translation (DAT) tables in a virtual storage environment, the method comprising:
   a computer determining a fault has occurred associated with an address of virtual storage that is shared by a base space and a plurality of subspaces of a subspace group, wherein the base space and each subspace of the subspace group include dynamic address translation (DAT) tables that translate addresses of the virtual storage that is shared, to corresponding locations of data in physical memory;
   responsive to determining that the fault has occurred, the computer updating information of the DAT tables of the base space that correspond to the fault and reflect a resolution of the fault;
   the computer determining whether a subspace of the subspace group is associated with application activity that has generated the fault; and
   responsive to determining that a subspace of the subspace group is associated with the application activity that has generated the fault, the computer copying the information of the DAT tables of the base space that correspond to the address of virtual storage associated with the fault, to the DAT tables of the subspace determined to be associated with the application activity that has generated the fault.

2. The method of claim 1, wherein the virtual storage environment includes a first subspace and a second subspace of the plurality of subspaces, further comprising:
   in response to determining the fault is generated by activity of an application associated with the first subspace, and not generated by activity of an application associated with the second subspace, the computer copying information from the DAT tables of the base space to the DAT tables of the first subspace, and not copying information from the DAT tables of the base space to the DAT tables of the second subspace.

3. A computer program product for managing dynamic address translation (DAT) tables in a virtual storage environment, the computer program product comprising:
one or more computer-readable, non-transitory storage devices and computer-readable program instructions which are stored on the one or more computer-readable, non-transitory storage devices, and when executed by one or more processors, perform the program instructions comprising:
program instructions to determine a fault has occurred associated with an address of virtual storage that is shared by a base space and a plurality of subspaces of a subspace group, wherein the base space and each subspace of the subspace group include dynamic address translation (DAT) tables that translate addresses of the virtual storage that is shared, to corresponding locations of data in physical memory;
program instructions to, responsive to determining that the fault has occurred, update information of the DAT tables of the base space that correspond to the fault and reflect a resolution of the fault;
program instructions to determine whether a subspace of the subspace group is associated with application activity that has generated the fault; and
program instructions to, responsive to determining that a subspace of the subspace group is associated with the application activity that has generated the fault, copy the information of the DAT tables of the base space that correspond to the address of virtual storage associated with the fault, to the DAT tables of the subspace determined to be associated with the application activity that has generated the fault.

4. The computer program product of claim 3, wherein the DAT tables of the base space include a hierarchy of DAT tables associated with the virtual storage that is shared with the, first subspace, and the DAT tables of the first subspace include a separate hierarchy of DAT tables associated with the virtual storage that is shared with the base space.

5. The computer program product of claim 3, wherein the program instructions stored on the one or more computer-readable, non-transitory storage devices further comprise:
program instructions to, in response to determining the fault is generated by activity of an application associated with a first subspace of the plurality of subspaces, update, of the DAT tables of the base space and the DAT tables of the plurality of subspaces, only the DAT tables of the base space, and to copy the information from the DAT tables of the base space to the DAT tables of the first subspace.

6. The computer program product of claim 3, wherein both the first subspace and the base space are assigned a specific range of virtual storage, in an address space of the virtual storage environment, and wherein the first subspace is contained within a subset of the virtual storage of the base space.

7. The computer program product of claim 3, wherein addresses of the virtual storage that are shared exclude the virtual storage addresses of a protected address space allocated for each subspace and virtual storage addresses of protected address space allocated for the base space.

8. The computer program product of claim 3, wherein the virtual storage environment includes a first subspace and a second subspace of the plurality of subspaces of the subspace group, further comprising:
program instructions to, in response to determining the fault is generated by activity of an application associated with the first subspace, and not generated by activity of an application associated with the second subspace, copy information from the DAT tables of the base space to the DAT tables of the first subspace and not copy information from the DAT tables of the base space to the DAT tables of the second subspace.

9. The method of claim 1, wherein the DAT tables of the base space include a hierarchy of DAT tables associated with the virtual storage that is shared with the first subspace, and the DAT tables of the first subspace include a separate hierarchy of DAT tables associated with the virtual storage that is shared with the base space.

10. The method of claim 1, wherein both the first subspace and the base space are assigned a specific range of virtual storage in an address space of the virtual storage environment, and wherein the first subspace is contained within a subset of the virtual storage of the base space.

11. The method of claim 1, wherein a program process of the computer operates in a subspace in which storage isolation and data protection is provided for each subspace within an address range of virtual storage.

12. The method of claim 1, wherein addresses of the virtual storage that are shared exclude addresses of the virtual storage of a protected address space allocated for each subspace and virtual storage addresses of protected address space allocated for the base space.

13. A computer system for managing dynamic address translation (DAT) tables in a virtual storage environment, the computer program product comprising:
one or more computer processors;
one or more computer-readable, non-transitory storage media; and
program instructions stored on the computer-readable, non-transitory storage media for execution by at least one of the one or more processors, the program instructions comprising:
program instructions to determine a fault has occurred associated with an address of virtual storage that is shared by a base space and a plurality of subspaces of a subspace group, wherein the base space and each subspace of the subspace group include dynamic address translation (DAT) tables that translate addresses of the virtual storage that is shared, to corresponding locations of data in physical memory;
program instructions to, responsive to determining that the fault has occurred, update information of the DAT tables of the base space that correspond to the fault and reflect a resolution of the fault;
program instructions to determine whether a subspace of the subspace group is associated with application activity that has generated the fault; and
program instructions to, responsive to determining that a subspace of the subspace group is associated with the application activity that has generated the fault, copy the information of the DAT tables of the base space that correspond to the address of virtual storage associated with the fault, to the DAT tables of the subspace determined to be associated with the application activity that has generated the fault.

14. The computer system of claim 13, wherein the DAT tables of the base space include a hierarchy of DAT tables associated with the virtual storage that is shared with the first subspace, and the DAT tables of the first subspace include a separate hierarchy of DAT tables associated with the virtual storage that is shared with the base space.

15. The computer system of claim 13, wherein the program instructions stored on the computer-readable, non-transitory storage media further comprise:

program instructions to, in response to determining the fault is generated by activity of an application associated with the first subspace, update, of the DAT tables of the base space and the DAT tables of the plurality of subspaces of the subspace group, only the DAT tables of the base space, and to copy information from the DAT tables of the base space to the DAT tables of the first subspace.

16. The computer system of claim 13, wherein both the first subspace and the base space are assigned a specific range of virtual storage in an address space of the virtual storage environment, and wherein the first subspace is contained within a subset of the virtual storage of the base space.

17. The computer system of claim 13, wherein a program process of the computer operates in a subspace in which storage isolation and data protection is provided for each subspace within an address range of virtual storage.

18. The computer system of claim 13, wherein addresses of the virtual storage that are shared exclude the addresses of the virtual storage of a protected address space allocated for each subspace and virtual storage addresses of protected address space allocated for the base space.

19. The computer system of claim 13, wherein the virtual storage environment includes a first subspace and a second subspace of the plurality of subspaces of the subspace group, further comprising:

program instructions to, in response to determining the fault is generated by activity of an application associated with the first subspace, and not generated by activity of an application associated with the second subspace, copy information from the DAT tables of the base space to the DAT tables of the first subspace and not copy information from the DAT tables of the base space to the DAT tables of the second subspace.

* * * * *